United States Patent
Aldern et al.

(10) Patent No.: US 7,072,689 B1
(45) Date of Patent: Jul. 4, 2006

(54) LOCK AND RELEASE MECHANISM FOR A WIRELESS DEVICE

(75) Inventors: Scott J. Aldern, Encinitas, CA (US); Paul T. Repp, Leucadia, CA (US); Jeffrey W. Hixson, Lakeside, CA (US)

(73) Assignee: Qualcomm, Inc., San Diego, CA (US)

( * ) Notice: Subject to any disclaimer, the term of this patent is extended or adjusted under 35 U.S.C. 154(b) by 1410 days.

(21) Appl. No.: 09/587,685

(22) Filed: Jun. 5, 2000

(51) Int. Cl.
*H04B 1/38* (2006.01)

(52) U.S. Cl. .................. 455/557; 455/550; 455/575; 455/90; 379/428.01; 379/428.04

(58) Field of Classification Search ................ 455/550, 455/575, 90, 345, 351; 379/428.01, 428.04, 379/446, 455, 454
See application file for complete search history.

(56) References Cited

U.S. PATENT DOCUMENTS

| | | | | |
|---|---|---|---|---|
| 5,896,564 A | * | 4/1999 | Akama et al. ................ | 455/90 |
| 5,907,796 A | * | 5/1999 | Matchett et al. .............. | 455/90 |
| 6,339,699 B1 | * | 1/2002 | Hirai et al. .................... | 455/90 |
| 6,341,218 B1 | * | 1/2002 | Poplawsky et al. ........... | 455/90 |
| 6,456,829 B1 | * | 9/2002 | Peiker ......................... | 455/90 |

* cited by examiner

*Primary Examiner*—William Trost
*Assistant Examiner*—Earl Moorman
(74) *Attorney, Agent, or Firm*—Philip R. Wadsworth; Gregory D. Ogrod

(57) ABSTRACT

A mechanism for securely locking and easily releasing a wireless device in a cradle is comprised of a release button located on an outer housing, accessible to a user. The release button extends through the outer housing to an interior in the cradle. An actuator is disposed in the housing and has an arm extending into the interior receptacle area of the cradle, wherein movement of the arm activates the mechanism. A lever is disposed within the housing and is rotatable between a first and a second position. A first end of the lever is located adjacent to the actuator, while a second end of the lever is located adjacent to the release button. A protrusion extends from the lever into the receptacle area when the lever is in the first position and is housed inside the housing when the lever is rotated to the second position. A spring connects the actuator to the lever.

24 Claims, 3 Drawing Sheets

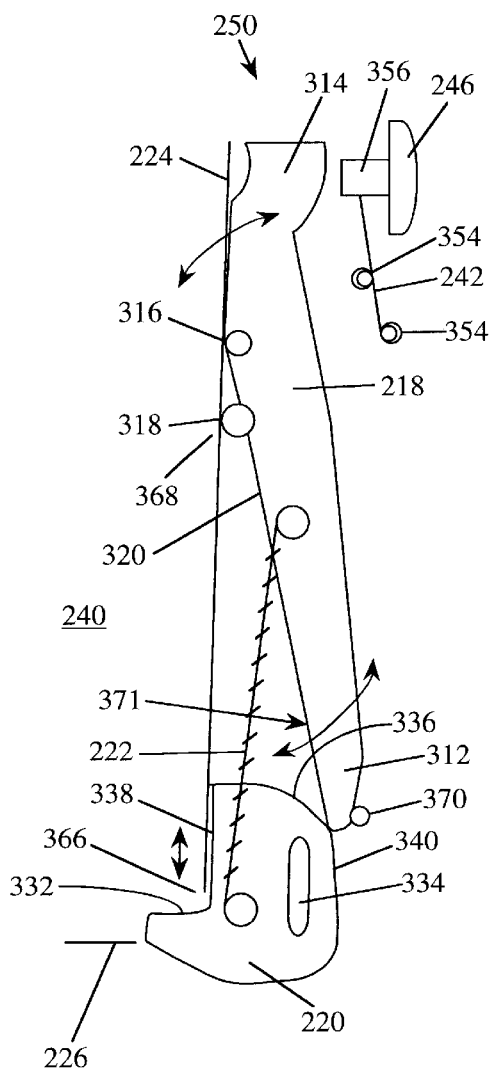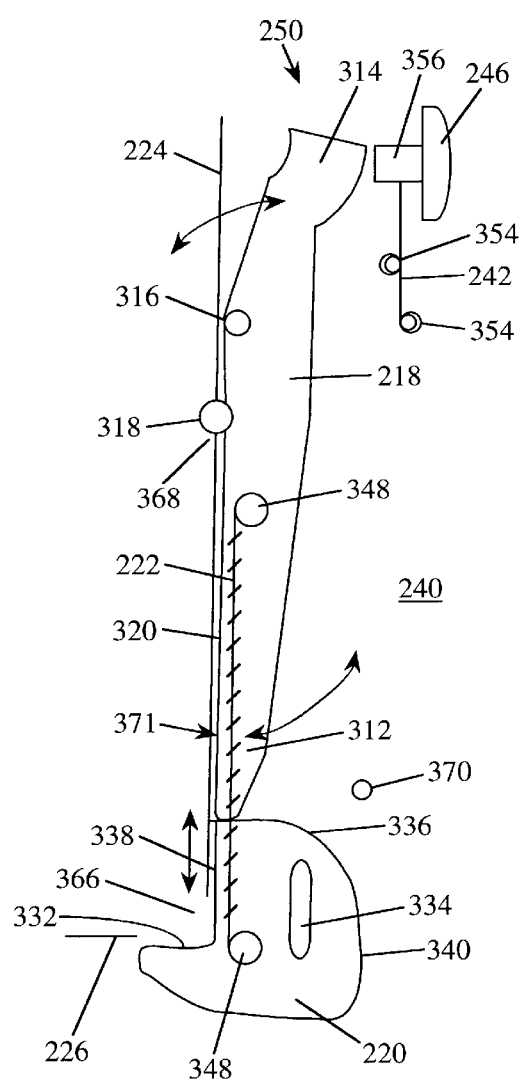
FIRST POSITION
FIG. 3A
SECOND POSITION
FIG. 3B

LOCK AND RELEASE MECHANISM FOR A WIRELESS DEVICE

BACKGROUND OF THE INVENTION

I. Field of the Invention

The present invention relates generally to a lock and release mechanism in a cradle used with a wireless device. More particularly, the invention relates to a mechanism for securely locking a wireless device in its cradle and for simply releasing the device from its cradle.

II. Related Art

In the past decade, wireless phone communications have become commonplace in daily life. In addition to phones carried on the person, there is increased wireless phone use while driving in cars. Many vehicles use hands-free car kits, which may include a cradle for a portable phone, and periphery components, such as a hands-free microphone, a speaker and an antenna. In use, the portable phone is placed in the cradle, where contacts on the phone meet and touch contacts in the cradle, electrically connecting the phone to the periphery components. A secure connection between the portable phone contacts and the phone cradle contacts is required for uninterrupted operation. These hands-free car kits allow a user to use the portable phone without having to pick-up or hold the phone.

Furthermore, wireless phone use inside of a vehicle is subject to a decibel loss due to the radio frequency shielding effect of the car's metal body. Therefore, cradles are often used in cars to provide a connection between the portable phone and an exterior antenna, attached to the phone cradle. Likewise, the cradle often contains components for recharging the battery used by the portable phone, which is done by connecting the cradle to a power source, such as the car battery.

While driving, a car is subject to exterior forces, such as bumps or dips in the road, and interior forces, such as engine vibration, that can vibrate, jostle or jar the interior of the car. As a cradle is generally installed in a car by attaching the cradle to the floor of the passenger compartment or the vehicle frame, it too is subject to the exterior and interior vibratory effects. Constant vibration or jostling can disrupt the electrical connection between the phone and the cradle, interrupting or breaking off communication and prolonging recharging times.

Additionally, most car travel is made in less than 10 mile increments. Therefore, with such short rides, and with continuously entering and exiting the car, a user must be able to quickly and easily secure the phone within the cradle when entering the car, and likewise, quickly and easily remove the phone from the cradle for use outside of the car.

Therefore, there is a need for a mechanism for securely holding a wireless device within its cradle so that the electrical contacts and communication connections are undisturbed even when the car is subject to vibration and bumps. Further there is a need for a mechanism that can quickly and easily release the device from its cradle, and likewise, can quickly and easily secure the device within its cradle for ease of use.

SUMMARY OF THE INVENTION

The present invention is useful for securely locking and easily releasing a wireless device from a cradle. The invention is directed to a mechanism for securely locking the wireless device within the cradle when the device is placed within the cradle and for easily releasing the device at the push of a button.

The mechanism for locking and releasing a wireless device in a cradle is comprised of a release button located on an outer housing, accessible to a user, biased to a neutral position by a leaf spring. The release button extends through the outer housing to an interior in the cradle. An actuator is disposed in the housing and has an arm extending into the interior chamber of the cradle. The arm can be depressed, activating the mechanism to secure the device in the cradle. A lever is disposed within the housing and is rotatable between a first and a second position for locking and releasing the wireless device. A first end of the lever is located adjacent to the actuator, while a second end of the lever is located adjacent to the release button. A protrusion extends from the lever into the wireless device chamber when the lever is in the first position, and is housed inside the housing when the lever is rotated to the second position. A spring, in tension, connects the actuator to the lever, holding the lever and actuator in contact with each other.

BRIEF DESCRIPTION OF THE FIGURES

FIG. 3A shows a mechanism for securing a device within a cradle of the present invention in a release position, or a first position.

FIG. 3B shows the mechanism of FIG. 3A in a lock position, or a second position.

DETAILED DESCRIPTION OF THE PREFERRED EMBODIMENTS

The preferred embodiment of the present invention is now described with reference to the figures where like reference numbers indicate identical or functionally similar elements. While the invention is described in terms of a specific embodiment, it should be understood that this is done for illustrative purposes only. A person skilled in the relevant art will recognize that various modifications, rearrangements and substitutions can be made without departing from the spirit of the invention. Furthermore, though the embodiment described relates to a phone and phone cradle, the invention can be used with any wireless device, including, but not limited to a satellite phone, a cellular phone, a position determining device, a paging device, or other receiver, etc.

Figure 1:
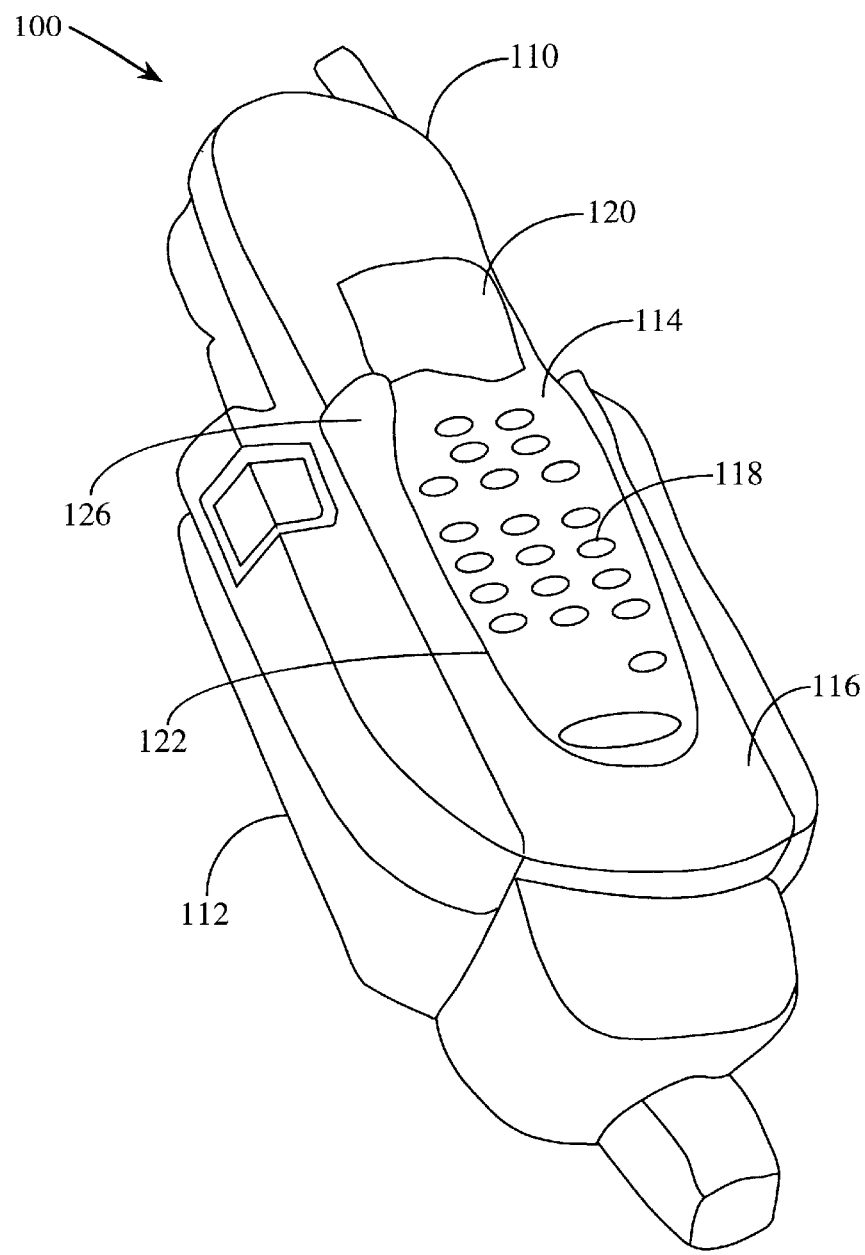
FIG. 1 is a perspective view of a phone held in a cradle of the present invention.

An embodiment of a phone and cradle arrangement 100, showing a phone 110 held within a cradle 112, is shown and described with reference to FIG. 1. Phone 110 can be held within cradle 112 for recharging, for use in an automobile, for safekeeping or any other practical reason. Cradle 112 includes a housing 116. A detailed discussion of cradle 112 is provided below with reference to FIG. 2. Phone 110 fits within cradle 112, through an opening located at one end 126 of cradle 112. The face of phone 110 is visible through a cutout 122 in housing 116 to allow access to the phone operating buttons 118 and the LCD display 120. This is preferred so that a user can dial a number or review information on the LCD display 120 while the phone is held within cradle 112.

Figure 2:
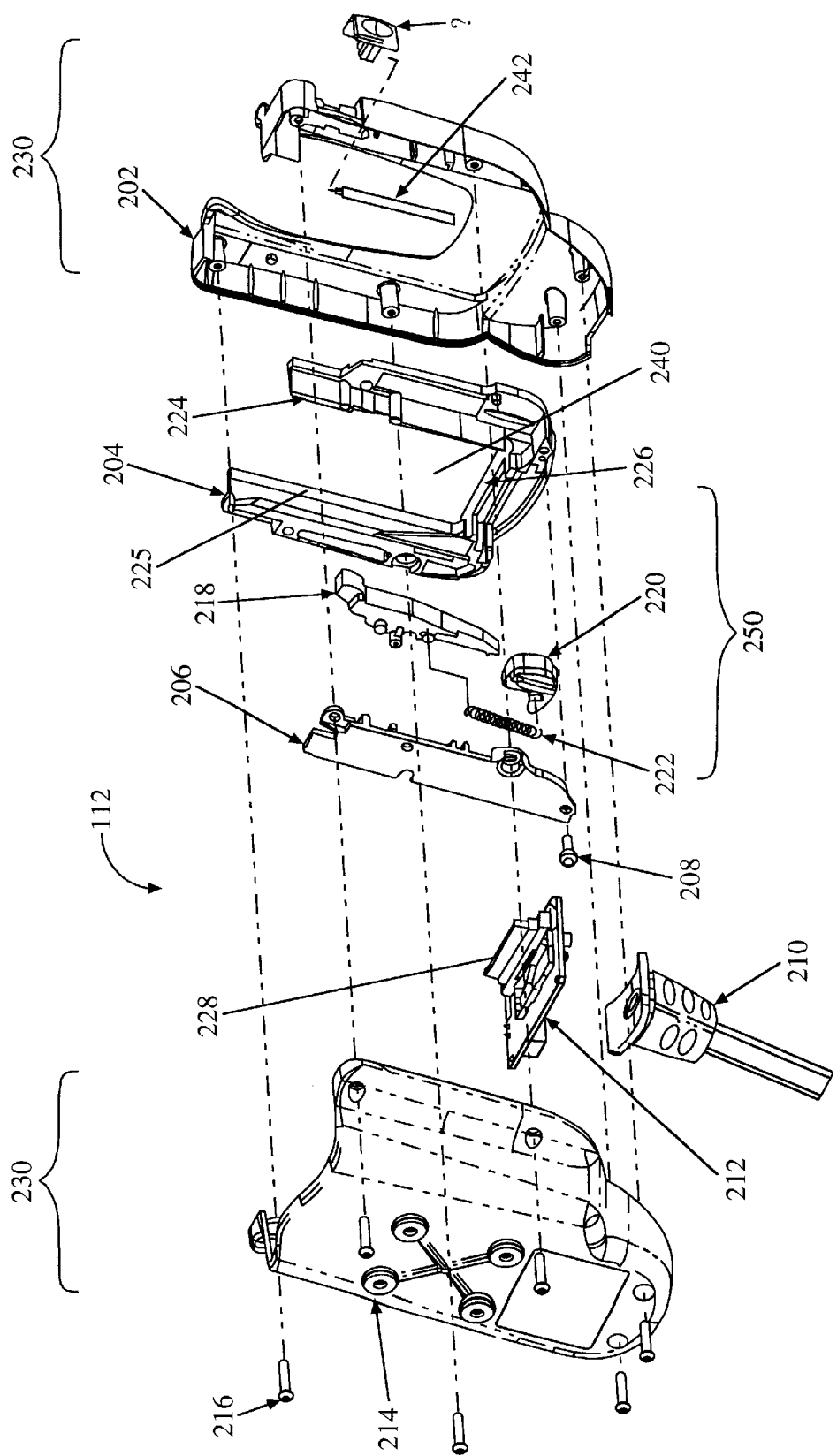
FIG. 2 is an exploded view of the cradle of FIG. 1.

FIG. 2 shows an exploded view of an embodiment of cradle 112 of the present invention. Cradle 112 has an outer housing 230, comprised of a front housing 202 and a rear housing 214. A release button 246 is located on front housing 202. Release button 246 extends through front housing 202 to meet with a leaf spring 242, located within front housing 202.

Between front housing 202 and rear housing 214 is an inner housing 204. Inner housing 204 is a U-shaped member which forms the sides of a phone receptacle area 240 into which a phone is received. Front housing 202 and rear housing 214 serve as the front and rear walls of phone receptacle area 240.

Inner housing 204 has a first sidewall 224, a second sidewall 225, and a floor 226. First sidewall 224 and floor 226 define and separate phone receptacle area 240 from a mechanism assembly 250. Mechanism assembly 250 is comprised of a lever 218, an actuator 220 and a spring 222, which interact with sidewall 224 and floor 226 of inner housing 204 to securely hold and easily release a phone from cradle 112. Mechanism assembly 250 is held in place, adjacent to sidewall 224, by a cover plate 206. Screw 208 extends through cover plate 206 into housing 204, to secure cover plate 206 to inner housing 204. As would be apparent to one skilled in the art, cover plate 206 can be secured to inner housing 204 using any number of methods, such as, for example, gluing, tacking, taping or interlocking pieces. Furthermore, the location of screw 208 is not critical, and could be located at any convenient location extending through cover plate 206 into inner housing 204. Securing mechanism assembly 250 between cover plate 206 and inner housing 204 allows inner housing 204 to be removed from cradle 112, while leaving mechanism assembly 250 intact. This is convenient if it should become necessary to disassemble cradle 112 to provide maintenance to, or to clean the electrical components found within.

A circuit board 212 connects with inner housing 204 to provide power to cradle 112. A phone, inserted into cradle 112, aligns with contacts 228 on circuit board 212 to recharge the phone battery or to connect the phone to periphery communication components, such as, for example, an antenna, a speaker or a microphone. A strain-relief having plugs 210 is secured to circuit board 212 and connects to a power source, the antenna, a diagnostic monitor, digital electronics in a module and/or other devices, as would be apparent to one skilled in the relevant art.

Screws 216 hold rear housing 214 to front housing 202, and secure there between all of the components in their proper positions. As would be apparent to one skilled in the art, other methods could be used to connect rear housing 214 to front housing 202. For example, fasteners, tape, glue, rivets or interlocking edges could be used to connect rear housing 214 to front housing 202.

Mechanism assembly 250 of the present invention is described with reference to FIG. 3A, which shows mechanism assembly 250 in a first position, and FIG. 3B, which shows mechanism assembly 250 in a second position. Mechanism assembly 250 is located within inner housing 204. Sidewall 224 and floor 226 of cradle 112 are visible in FIGS. 3A and 3B. Mechanism assembly 250 is comprised of lever 218, actuator 220, and spring 222, as described in reference to FIG. 2. Lever 218 includes a first end 312, narrow at the tip, located adjacent actuator 220. Likewise, a second end 314 of lever 218 is located opposite first end 312. Between first end 312 and second end 314 is located a fulcrum 316, about which lever 218 rotates. In this embodiment, fulcrum 316 is a cylinder integrally formed with lever 218, projecting from each side of lever 218 into mating recesses (not shown) located in inner housing 204 and cover plate 206. As would be apparent to one skilled in the relevant art, fulcrum 316 could be implemented in a variety of different ways. For example, fulcrum 316 could be a rod passing through lever 218 or a hole through lever 218 into which projections from inner housing 204 protrude. Furthermore, fulcrum 316 need not be round, but only must serve as a point about which lever 218 can rotate.

Located between fulcrum 316 and first end 312 is a protrusion 318, extending from a side 320 of lever 218. Protrusion 318 is shaped to match an indentation in the profile of a phone (not shown) when the phone is fully inserted into cradle 112. Though protrusion 318 can be any shape, it is advantageous for protrusion 318 be smoothly shaped for easier coupling with the profile of the phone. When protrusion 318 is coupled with the indentation in the phone profile, the phone is securely locked within cradle receptacle area 240.

As shown, sidewall 224 is located adjacent to lever 218. Sidewall 224 separates phone receptacle area 240 from mechanism assembly 250. Inner wall 224 of inner housing 204 has a gap 368 therein, aligned proximate protrusion 318. When mechanism assembly 250 is in a first position, protrusion 318 is located within inner housing 204, as shown in FIG. 3A. However, when mechanism assembly 250 is in a second position, as shown in FIG. 3B, protrusion 318 extends through gap 368 into phone receptacle area 240.

Lever 218 can rotate around fulcrum 316 until first end 312 contacts a stop 370, fixedly located on inner housing 204. As would be apparent to one skilled in the relevant art, stop 370 can be integral with inner housing 204 or can be a separate component, attached to inner housing 204. Likewise, lever 218 can rotate around fulcrum 316 until the body of lever 218 contacts sidewall 224. Though stop 370 and sidewall 224 serve to limit the rotation of lever 218, it would be obvious to one skilled in the relevant art that other stops or parts could be used to limit the rotation of lever 218. For example, sidewall 224 could be used to limit the rotational path at second end 314 of lever 218, instead of stop 370 limiting the path of first end 312 of lever 218.

Located adjacent first end 312, is actuator 220. Actuator 220 is comprised of a contact plate 336, which extends from a corner adjacent sidewall 224. Contact plate 336 extends roughly perpendicular to sidewall 224, around a sloping corner to a first side 340 of actuator 220, in a convex shape. Actuator 220 has an arm 332 extending from a second side 338. Actuator 220 is slidably attached to inner housing 204 by a slider 334. Slider 334 is located on each side of actuator 220 and protrudes to mesh with a groove (not shown) formed in inner housing 204 and cover plate 206. Slider 334 slides within the groove formed in inner housing 204 to allow actuator 220 to move along a slight arc. It would be obvious to one skilled it the art that other means of motion could be used, such as linear slides, rotation around a pin, and so forth.

Arm 332 extends beyond sidewall 224 into phone receptacle area 240, when in a first position, as shown in FIG. 3A. Actuator 220 can slide along slider 334 from a first position to a second position as shown in FIG. 3B. As shown in the second position, arm 332 is located below floor 226 and outside of phone receptacle area 240. The movement of mechanism assembly 250 from the first position to the second position will be explained in more detail below.

Sidewall 224 includes a slot 366, located where sidewall 224 meets floor 226 of inner housing 204. Slot 366 extends through and along floor 224 to accommodate arm 332 as arm 332 moves from the first position to the second position.

Lever 218 is connected to actuator 220 by spring 222. Spring 222 has hooks at each end that wrap around spring connectors 348, located on lever 218 and actuator 220. Connectors 348 are protrusions having a lip (not shown) which restrains spring 222 so that spring 222 does not slip off of connectors 348. As would be apparent to one skilled in the relevant art, spring 222 can be connected to lever 218 and actuator 220 by any number of methods. For example, the ends of spring 220 could be placed within holes in lever 218 and actuator 220. Likewise, spring 222 could be attached by hooks, secured in indentations, soldered, welded, or otherwise bonded to lever 218 and actuator 220.

Spring 222 is disposed in tension, and holds lever 218 tightly against actuator 220. Spring 222 must be strong enough to hold lever 218 and actuator 220 tightly against each other, but must be able to be easily stretched to allow mechanism assembly 250 to move from a first position to a second position.

Release button 246 is housed in front housing 202 of FIG. 2, and has an extension 356 extending through front housing 202 to a location adjacent second end 314 of lever 218. Connected to extension 356 is leaf spring 242, positioned by spring stops 354. Button 246 is biased by leaf spring 242 to a neutral position, as shown in FIG. 3B.

The activation of mechanism assembly 250 from the first position of FIG. 3A to the second position of FIG. 3B will now be described in detail. FIG. 3A shows mechanism assembly 250 before a phone is inserted into cradle 112. When a phone is placed into cradle 112, the bottom of the phone contacts and depresses arm 332. The phone moves arm 332 linearly downward and out of phone receptacle area 240 into inner housing 204. Actuator 220, being fixedly attached to arm 332, is likewise linearly moved until actuator 220 rests in the second position shown in FIG. 3B. The movement of actuator 220 imposes a force on spring 222, which transfers that force to lever 218, rotating lever 218 around fulcrum 316. Therefore, as actuator 220 is depressed, first end 312 of lever 218 is pulled by spring 222 from the first position of FIG. 3A toward the second position of FIG. 3B. First end 312 can change positions as fast as actuator 220 is depressed, as first end 312 moves into a position previously occupied by actuator 220.

As mechanism 250 moves from the first position of FIG. 3A to the second position of FIG. 3B, a mechanical stop 371 fixed to lever 218 contacts wall 224, halting movement. Thus, lever 218 aligns itself next to sidewall 224, extending protrusion 318 through gap 368 into phone receptacle area 240. The phone has an indent in its profile into which protrusion 318 enters, locking the phone into place. Protrusion 318 securely holds the phone within the cradle 112.

As lever 218 aligns with sidewall 224, first end 312 reaches the top surface of actuator 220, where it rests. Release button 246 and leaf spring 242 play no role in moving mechanism assembly 250 from the first position to the second position.

The activation of mechanism assembly 250 from the second position of FIG. 3B to the first position of FIG. 3A will now be described in detail. To release the phone from its locked position, a user presses button 246. Extension 356, fixedly attached to button 246 is moved by button 246 toward second end 314 of lever 218. Leaf spring 242 yields to the force applied on button 246, as shown in FIG. 3A. Upon release of button 246, leaf spring 242 returns button 246 to its neutral position.

As button 246 is forced inwardly by the user, extension 356 contacts and moves second end 314 of lever 218. Lever 218 rotates around fulcrum 316, causing displacement of first end 312 of lever 218. As first end 312 moves off of the top surface of actuator 220, spring 222 pulls actuator into the position previously occupied by first end 312 of lever 218. As actuator 220 advances, first end 312 slides along contact plate 336 until first end 312 contacts stop 370. When movement of first end 312 is halted, movement of actuator 220 is likewise halted.

As lever 218 rotates away from sidewall 224, protrusion 318 retracts into inner housing 204 through gap 368, releasing the phone. Simultaneously, arm 332 moves through floor 226 into phone receptacle area 240, thereby lifting the phone off of floor 226. The phone, now released from protrusion 318, can be easily lifted from cradle 112.

In another embodiment, the mechanism is securely held in place by components of the outer housing, eliminating the need for an inner housing. Thus, the mechanism can be used with or without an inner housing.

While the invention has been particularly shown and described with reference to preferred embodiments thereof, it will be understood by those skilled in the art that various changes in form and detail may be made therein without departing from the spirit and scope of the invention.

What we claim as the invention is:

1. A lock and release mechanism for use in a wireless device cradle having an interior and an exterior housing, comprising:
   a release button disposed on the exterior housing and biased to a outward position;
   an actuator disposed in the interior housing having,
   an arm extending therefrom, wherein movement of said arm activates the mechanism;
   a lever disposed adjacent said actuator in the interior housing, rotatable between a first position and a second position, including:
   a first end adjacent to said actuator;
   a second end adjacent to said release button; and
   a protrusion extending from said lever disposed within the interior housing when said lever is in said first position and disposed outside the interior housing when said lever is in said second position; and a spring connecting said actuator to said lever.

2. The mechanism of claim 1, wherein said actuator further includes a contact plate for contacting said first end of said lever.

3. The mechanism of claim 2, wherein said contact plate is generally convex in shape.

4. The mechanism of claim 1, wherein said first end of said lever is adjacent to one side of said actuator when said lever is rotated to said first position and is adjacent to the other side of said actuator when said lever is rotated to said second position.

5. The mechanism of claim 1, wherein when said lever is rotated to said first position, the arm of said actuator is in a raised position, and when said lever is rotated to said second position, the arm is in a lowered position.

6. The mechanism of claim 1, wherein said arm extends out from said interior housing.

7. The mechanism of claim 1, wherein said lever is rotatable about a centrally located fulcrum.

8. The mechanism of claim 1, wherein said lever rotates from said second position to said first position when said release button contacts said lever.

9. The mechanism of claim 1, wherein said arm is integrally formed with said actuator.

10. The mechanism of claim 1, wherein said protrusion is integrally formed with said lever.

11. The mechanism of claim 1, wherein said actuator translates between a first position and a second position along an axis.

12. The mechanism of claim 1, wherein said spring maintains the lever and actuator in contact with one another.

13. A lock and release mechanism for use in a wireless device cradle having a housing comprising
- a release button disposed on the housing and biased to a neutral position;
- an actuator disposed in the housing movable between a first and a second position having,
  - an arm extending therefrom, wherein movement of said arm activates the mechanism;
- a lever disposed adjacent said actuator in the housing, rotatable between a first position and a second position, including:
  - a first end adjacent to said actuator;
  - a second end adjacent to said release button; and
  - a protrusion extending from said lever disposed within the housing when said lever is in said first position and disposed outside the housing when said lever is in said second position; and means for biasing the actuator to said first position and said lever to said second position.

14. The mechanism of claim 13, wherein said first end of said lever is adjacent to one side of said actuator when said lever is rotated to said first position and is adjacent to the other side of said actuator when said lever is rotated to said second position.

15. The mechanism of claim 13, wherein when said lever is rotated to said first position, the arm of said actuator is in a raised position, and when said lever is rotated to said second position, the arm is in a lowered position.

16. The mechanism of claim 13, wherein said lever rotates from said second position to said first position when said release button contacts said lever.

17. A wireless device cradle comprising:
an interior and an exterior housing, including:
- a lock and release mechanism further including:
  - a release button disposed on the exterior of housing and biased to a neutral position;
  - an actuator disposed in the interior housing having,
    - an arm extending therefrom, wherein movement of said arm activates the mechanism;
  - a lever disposed adjacent said actuator in the interior housing, rotatable between a first position and a second position, including:
    - a first end adjacent to said actuator;
    - a second end adjacent to said release button; and
    - a protrusion extending from said lever disposed within the interior housing when said lever is in said first position and disposed outside the interior housing when said lever is in said second position; and a spring connecting said actuator to said lever.

18. The mechanism of claim 17, wherein said first end of said lever is adjacent to one side of said actuator when said lever is rotated to said first position and is adjacent to the other side of said actuator when said lever is rotated to said second position.

19. The mechanism of claim 17, wherein when said lever is rotated to said first position, the arm of said actuator is in a raised position, and when said lever is rotated to said second position, the arm is in a lowered position.

20. The mechanism of claim 17, wherein said lever rotates from said second position to said first position when said release button contacts said lever.

21. In combination with a wireless device having an indent therein, a wireless device cradle comprising:
an interior and an exterior housing, including:
- a lock and release mechanism further including:
  - a release button disposed on the exterior of housing and biased to a neutral position;
  - an actuator disposed in the interior housing having,
    - an arm extending therefrom, wherein movement of said arm activates the mechanism;
  - a lever disposed adjacent said actuator in the interior housing, rotatable between a first position and a second position, including:
    - a first end adjacent to said actuator;
    - a second end adjacent to said release button; and
    - a protrusion extending from said lever disposed within the interior housing when said lever is in said first position and disposed outside the interior housing when said lever is in said second position, wherein when lever is in said second position, said protrusion interlocks with the indent in the wireless device; and a spring connecting said actuator to said lever.

22. The combination of claim 21, wherein said first end of said lever is adjacent to one side of said actuator when said lever is rotated to said first position and is adjacent to the other side of said actuator when said lever is rotated to said second position.

23. The combination of claim 21, wherein when said lever is rotated to said first position, the arm of said actuator is in a raised position, and when said lever is rotated to said second position, the arm is in a lowered position.

24. The combination of claim 21, wherein said lever rotates from said second position to said first position when said release button contacts said lever.

* * * * *